Aug. 1, 1961  K. M. NEWCUM  2,994,295
INDICATOR FOR REFRIGERATION LINES
Filed Sept. 1, 1959

INVENTOR.
KENNETH M. NEWCUM
BY
Brown, Critchlow, Flick & Peckham
HIS ATTORNEYS

United States Patent Office 2,994,295
Patented Aug. 1, 1961

2,994,295
INDICATOR FOR REFRIGERATION LINES
Kenneth M. Newcum, Zelienople, Pa., assignor, by mesne assignments, to American Radiator & Standard Sanitary Corporation, New York, N.Y., a corporation of Delaware
Filed Sept. 1, 1959, Ser. No. 837,492
4 Claims. (Cl. 116—117)

This invention relates to an indicator which is adapted to be inserted in the refrigerant-carrying line of a refrigeration or air-conditioning system. It can be used to determine the presence of air, other non-condensables, refrigerant vapor, or moisture in the liquid refrigerant.

The present invention provides an improved combination device of this type, which is simple, of rugged construction, and which does not cause any substantial turbulence in the flowing stream of refrigerant.

Figure 1:
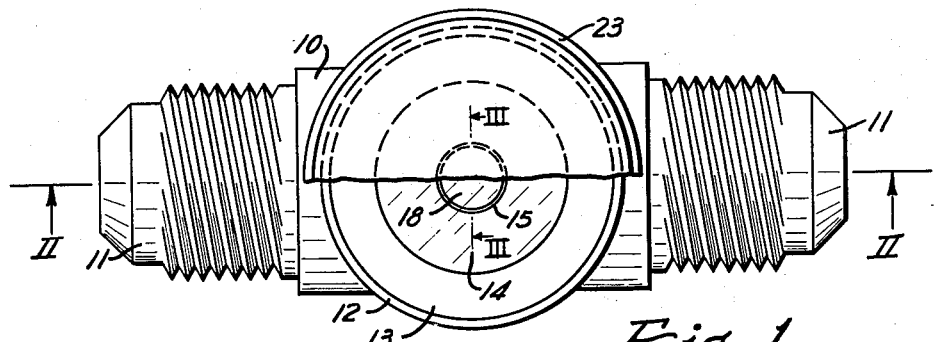
Figure 2:
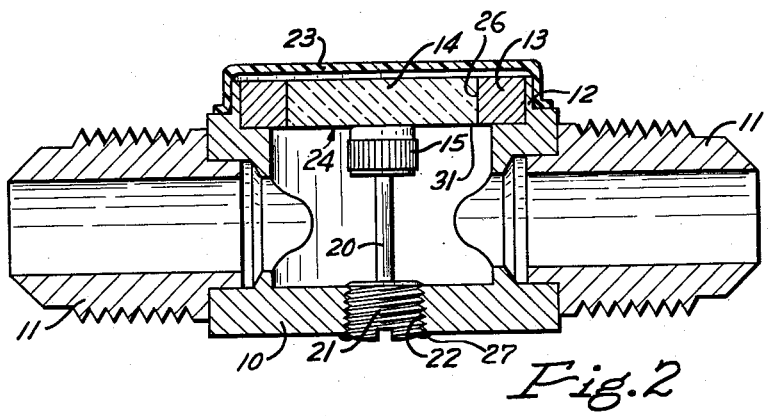
Figure 3:
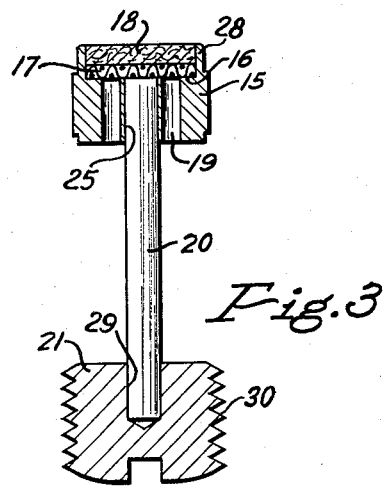

In the drawings:
FIG. 1 is a plan view partly broken away of a fitting incorporating the present invention;
FIG. 2 is a section on line II—II of FIG. 1; and
FIG. 3 is an enlarged sectional view of the moisture indicator subassembly taken substantially along line III—III of FIGURE 1 looking in the direction of the arrows.

Referring to the drawings more particularly, the indicator fitting includes a main body 10 provided with coupling extensions 11. The parts 10 and 11 in the embodiment shown are formed of brass. The coupling extensions 11 are illustrated as being conventional flare fittings.

The upper surface of the body 10 is provided with a circular flange 12 which is adapted to receive the sight glass assembly 24.

The sight glass assembly includes a metal ring 13 and a sight glass 14. The sight glass 14 consists of a relatively thick piece of crystal-clear glass which at 26 has a fused glass-to-metal attachment to the metal ring. It will be seen that this construction provides a permanent leakproof construction able to withstand any combination of pressure and temperature encountered in refrigeration and air-conditioning systems. The sight glass has optical quality equal to plate glass and the interior of the indicator body 10 is given a bright finish to give excellent light reflection. Thus the most minute bubbles passing through the indicator may be readily detected.

The moisture indicator subassembly (see FIG. 3) includes a housing 15 the upper end of which is counterbored to form a cup-shaped portion 28 having a bottom wall 16. A circular piece of fine metal screening 17 rests on the bottom of the cup 28 and the moisture indicator element 18 rests on top of the screen 17.

The moisture indicator element 18 is a piece of filter paper or similar fibrous material which has been impregnated with certain salts which change color in the presence of small amounts of water. At the present time it is preferred to use a mixture of cobaltous bromide and cobaltous chloride. The indicator is prepared by soaking cellulose paper in a solution containing from 2 to 3% of each of these salts and then drying the paper to produce a final concentration of from 4 to 6% of each salt in the dried paper. The cellulose paper is then laminated to a filter paper. This material is sufficiently sensitive to the presence of minute amounts of water to be effective in indicating injurious amounts of water in all presently-used types of refrigerant.

The main body of housing 15 is formed with openings 19 which extend from the bottom wall 16 through to the bottom of housing 15. The purpose of the openings 19 is to permit the liquid refrigerant to pass through housing 15, through screen 17 and come into contact with the moisture indicator 18.

A support pin 20 has a tight pressed fit with an opening 25 formed in the housing 15. The openings 19 as shown are formed as slots which extend to the opening for pin 20.

A threaded plug 21 is formed with a bore 29 which has a pressed fit on the lower end of cylindrical support pin 20 and the outer surface of plug 21 is formed with screw threads 30 which interfit with threads formed in an opening 22 formed in the bottom of main body 10 as shown in FIG. 2. The threaded plug 21 is of larger diameter than the housing 15, so that the entire moisture indicator subassembly may be inserted through opening 22.

The support pin 20 is of such a size that when the moisture indicator subassembly is attached to the main body 10 by screwing the threaded plug 21 into the threaded opening 22, the upper end of the moisture indicator housing 15 is in contact with the lower face 31 of the sight glass 14. After the parts have been assembled to this position, the plug 21 is soldered at 27 to the body to form a permanent hermetic seal.

As a result of this construction, the refrigerant flowing through the fitting may pass through the openings 19 and reach the moisture indicator 18. At the same time the moisture indicator 18 is protected from direct contact with the flowing refrigerant by the glass 14 above the element and the filter below the element. Thus leaching and discoloration of the moisture indicator 18 is eliminated and positive trouble-free moisture indication is assured at all times.

A suitable cap 23 may be placed over the top of the sight glass in order to prevent the accumulation of grease and dirt on the glass. In the form illustrated a plastic snap-on cap is used although a screw-on metal cap may be used if preferred.

It will be evident that this fitting does not provide any substantial cause for turbulence nor restriction in the flow of refrigerant. The housing 15 and the threaded plug 21 may be located outside of the normal bore of the coupling extensions 11 so that the support pin 20 is the only structure lying in the normal path of the stream of refrigerant. This support pin 20 is round and of such small diameter that it does not cause any substantial disturbance of the flowing stream.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:
1. An indicating device of the type which comprises a fitting having a body formed with a passage for the flow of liquid refrigerant, said body having a first aperture, a transparent member mounted in said first aperture, and a moisture-indicating element located within said passage of the body in close proximity to said transparent member so as to be visible therethrough, the improvement which comprises said body having a second aperture oppositely disposed from said first aperture, a plug mounted in said second aperture, a stem carried on the plug and extending towards the transparent member, and a cup-shaped member enclosing said moisture-indicating element mounted on the stem adjacent to the transparent member, said cup-shaped member having an open top adjacent to the transparent member, a closed side wall, and a perforated bottom.

2. A device as specified in claim 1 in which the stem is in the form of a cylindrical member of relatively small diameter.

3. A device as specified in claim 1 in which the plug is of larger diameter than the cup-shaped member.

4. A device as claimed in claim 1 and further characterized in that the plug is hermetically sealed to the body whereby to prevent removal of the plug during use and to prevent the passage of fluid thereby.

References Cited in the file of this patent

UNITED STATES PATENTS

| | | |
|---|---|---|
| 2,716,338 | Blinn | Aug. 30, 1955 |
| 2,744,487 | Moore | May 8, 1956 |
| 2,818,766 | Hutchinson | Jan. 7, 1958 |
| 2,844,026 | Wischmeyer | July 22, 1958 |
| 2,888,898 | Patterson | June 2, 1959 |